(12) United States Patent
Barden et al.

(10) Patent No.: US 12,075,794 B2
(45) Date of Patent: Sep. 3, 2024

(54) OXIDATIVE STABILITY OF OIL-IN-WATER EMULSIONS USING NATURAL STABILIZERS

(71) Applicant: Kraft Foods Group Brands LLC, Chicago, IL (US)

(72) Inventors: Leann M. Barden, Chicago, IL (US); Judith G. Moca, Palatine, IL (US); Ryan M. High, Dunedin (NZ); Michael D. Putnam, Seattle, WA (US)

(73) Assignee: Kraft Foods Group Brands LLC, Chicago, IL (US)

(*) Notice: Subject to any disclaimer, the term of this patent is extended or adjusted under 35 U.S.C. 154(b) by 34 days.

(21) Appl. No.: 17/565,866

(22) Filed: Dec. 30, 2021

(65) Prior Publication Data
US 2022/0117249 A1 Apr. 21, 2022

Related U.S. Application Data (63) Continuation of application No. 16/957,849, filed as application No. PCT/US2017/068904 on Dec. 29, 2017, now Pat. No. 11,246,323.

(51) Int. Cl.
| | |
|---|---|
| B65D 81/34 | (2006.01) |
| A23D 7/005 | (2006.01) |
| A23D 7/06 | (2006.01) |
| A23L 27/60 | (2016.01) |
| A23L 29/10 | (2016.01) |
| A23L 29/231 | (2016.01) |
| A23L 29/256 | (2016.01) |

(52) U.S. Cl.
CPC ............. *A23D 7/06* (2013.01); *A23D 7/0053* (2013.01); *A23L 27/60* (2016.08); *A23L 29/10* (2016.08); *A23L 29/231* (2016.08); *A23L 29/256* (2016.08)

(58) Field of Classification Search
CPC ......... A23D 7/06; A23D 7/0053; A23L 27/60; A23L 29/10; A23L 29/231; A23L 29/256
USPC ....................................................... 426/605
See application file for complete search history.

(56) References Cited

U.S. PATENT DOCUMENTS

| | | | |
|---|---|---|---|
| 5,080,921 | A | 1/1992 | Reimer |
| 5,085,903 | A | 2/1992 | Kapp |
| 5,641,533 | A | 6/1997 | Ambjerg Pedersen |
| 5,728,681 | A | 3/1998 | Kido |

(Continued)

FOREIGN PATENT DOCUMENTS

| | | |
|---|---|---|
| EP | 0758531 | 2/1997 |
| EP | 2198724 | 6/2010 |

(Continued)

OTHER PUBLICATIONS

Japanese Patent Application No. JP2020-536152, Decision of Refusal, dated May 17, 2022, 8 pages (with Engish translation).

(Continued)

*Primary Examiner* — Brent T O'Hern
(74) *Attorney, Agent, or Firm* — Fitch, Even, Tabin & Flannery LLP (57) ABSTRACT

Food and beverage products including natural stabilizers, and particularly to replace EDTA, are provided. In particular, the food products comprise oil-in-water emulsions and the natural stabilizers include high molecular weight polymers which are effective to extend the shelf-life of the products.

18 Claims, 4 Drawing Sheets

(56) References Cited

U.S. PATENT DOCUMENTS

| | | | |
|---|---|---|---|
| 5,770,233 A | 6/1998 | Kido | |
| 5,948,458 A | 9/1999 | Swartz | |
| 5,968,896 A | 10/1999 | Bell | |
| 6,475,539 B1 | 11/2002 | Dewille | |
| 7,595,073 B2 | 9/2009 | Baldwin | |
| 9,486,007 B2 | 11/2016 | Burnett | |
| 11,246,323 B2 | 2/2022 | Barden | |
| 2002/0045016 A1 | 4/2002 | Rohrer | |
| 2002/0177837 A1 | 11/2002 | Barnitz | |
| 2002/0197382 A1 | 12/2002 | Kuijpers | |
| 2003/0102246 A1 | 6/2003 | Berthold | |
| 2003/0104108 A1 | 6/2003 | Patel | |
| 2005/0079268 A1 | 4/2005 | Eckhardt | |
| 2005/0107574 A1 | 5/2005 | Little | |
| 2006/0088574 A1 | 4/2006 | Manning | |
| 2007/0065396 A1 | 3/2007 | Morariu | |
| 2007/0141124 A1 | 6/2007 | Johns | |
| 2007/0197648 A1 | 8/2007 | Inooka | |
| 2009/0047406 A1 | 2/2009 | Banken | |
| 2009/0238926 A1 | 9/2009 | Hara | |
| 2010/0028518 A1 | 2/2010 | West | |
| 2010/0159089 A1* | 6/2010 | Lis | A23L 15/25 426/271 |
| 2012/0157904 A1 | 6/2012 | Stein | |
| 2013/0095189 A1 | 4/2013 | Jouni | |
| 2013/0095204 A1 | 4/2013 | Jouni | |
| 2014/0199265 A1 | 7/2014 | Kuang | |
| 2015/0023922 A1 | 1/2015 | Kuang | |
| 2015/0045453 A1* | 2/2015 | Endo | A23L 29/231 514/777 |
| 2015/0099054 A1 | 4/2015 | Steinberg | |
| 2015/0164833 A1 | 6/2015 | Kuang | |
| 2015/0181914 A1 | 7/2015 | Acharya | |
| 2015/0238527 A1 | 8/2015 | Chang | |
| 2016/0152398 A1 | 6/2016 | Sakata | |
| 2017/0064984 A1* | 3/2017 | Wang-Nolan | A23D 7/003 |

FOREIGN PATENT DOCUMENTS

| | | |
|---|---|---|
| JP | H04228051 A | 8/1992 |
| JP | H09103264 | 4/1997 |
| JP | 2004535793 A | 12/2004 |
| WO | 1996033701 | 10/1996 |
| WO | 2000068000 | 11/2000 |
| WO | 2004082559 | 9/2004 |
| WO | 2005039315 | 5/2005 |
| WO | 2005059075 | 6/2005 |
| WO | 2007058350 | 5/2007 |
| WO | 2007075683 | 7/2007 |
| WO | 2012017984 | 2/2012 |
| WO | 2012141933 | 10/2012 |
| WO | 2013075940 | 5/2013 |
| WO | 2013087419 | 6/2013 |
| WO | 2013115214 | 8/2013 |
| WO | 2013189709 | 12/2013 |
| WO | 2015171906 | 11/2015 |
| WO | 2016023811 | 2/2016 |
| WO | 2016057818 | 4/2016 |
| WO | 2017031363 | 2/2017 |

OTHER PUBLICATIONS

Japanese Patent Application No. JP2020-536152; PreAppeal ReExamination Report; drafting date Nov. 16, 2022; 8 pages (with English Translation).

Japanese Patent Application No. JP2020-536152; Third-Party Observation; dated Nov. 4, 2022; 8 pages (with English Translation).

Diaz, Mariana, et al., "Use of Caseinophosphopeptides as Natural Antioxidants in Oil-in-Water Emulsions." Journal of Agricultural and Food Chemistry, 2003, vol. 51, pp. 2365-2370.

Falkeborg, Mia, et al., "Alginate Oligosaccharides: Enzymatic Preparation and Antioxidant Property Evaluation." Food Chemistry, 2014, vol. 164, pp. 185-194.

International Patent Application No. PCT/US2017/068904, International Search Report, dated Jun. 24, 2019, 5 pages.

International Patent Application No. PCT/US2017/068904, Written Opinion, dated Jun. 24, 2019, 8 pages.

Japanese Patent Application No. JP2020-536152, Notification of Reasons for Refusal, dated Aug. 10, 2021, 8 pages (with Engish translation).

Mengome, Line Edwige, et al., "Screening of Antioxidant Activities of Polysaccharides Extracts From Endemic Plants in Gabon." Bioactive Carbohydrates and Dietary Fibre, 2014, vol. 3, pp. 77-88.

Office Action, European Application No. 17929428.5, dated Jul. 1, 2022, 4 pages.

Polymer Additives: UV and Light Blocking Additives, PolyOne Corporation, <https://www.polyone.com/products/polymer-additives/uv-and-light-blocking-additives>, believed to be known prior than Dec. 29, 2017, 9 pages.

Product Bulletin, ColorMatrix Lactra SX Light Blocking Additive, PolyOne Corporation, <polyone.com>, 2016, 2 pages.

Product Information & Technical Data Sheet, ColorMatrix Ultimate UV390, PolyOne, <colormatrix.com>, believed to be known prior than Dec. 29, 2017, 4 pages.

\* cited by examiner

OXIDATIVE STABILITY OF OIL-IN-WATER EMULSIONS USING NATURAL STABILIZERS

CROSS REFERENCE TO RELATED APPLICATION

This application is a continuation of U.S. application Ser. No. 16/957,849, filed on Jun. 25, 2020, now U.S. Pat. No. 11,246,323, which is a U.S. national phase filed under 35 U.S.C. § 371 of International Application No. PCT/US2017/068904, filed on Dec. 29, 2017, which are incorporated herein by reference in their entireties.

FIELD

The present disclosure generally relates to use of natural stabilizers in food and beverage products to extend the shelf-life of the products.

BACKGROUND

Oxidation is a series of chemical reactions that occurs in oil-containing food and beverage products, which can cause the products to spoil and become unpleasing in taste and/or appearance. Oxidation reactions, and the concurrent production of free radicals, occur at different rates, which are influenced by moisture, high temperature, exposure to UV light, and presence of oxygen and/or metal ions, such as iron or copper. The polyunsaturated fatty acid content of the oil can also contribute to susceptibility to oxidation. Oxidation of fat and oil in food and beverage products can lead to rancidity, which can cause loss of nutritional value and favorable organoleptic properties, such as texture, flavor, color, and aroma in the product.

To improve oxidative stability, free metal ions (such as iron and copper ions) may be removed through chelation by the inclusion of a chelator in the food and beverage products. One very commonly used chelator is ethylenediaminetetraacetic acid (EDTA). EDTA has been widely used in the food industry due to its relatively low cost and high ability to chelate metal ions. EDTA is often used to protect products from oxidation and spoilage and to improve flavor quality and color retention.

Mayonnaise products include a large amount of liquid oil (generally at least 65% oil), and also egg product, which provides a desirable egg flavor and functions as an emulsifier. However, the relatively high level of metal ions, particularly iron, present in egg yolk promotes lipid oxidation reaction (even at ppm levels) and thus limits the shelf-life of oil-containing products. The local water supply, processing equipment, and other ingredients may also contribute iron. To counteract this, EDTA (usually calcium EDTA or disodium EDTA) is often added. Due at least in part to the perception by consumers that EDTA is a synthetic or artificial ingredient, there has been continued demand for the removal of so called artificial ingredients and their replacement with natural alternatives, which may enable a "No Artificial Preservatives" (NAP) label on the food or beverage products. Additionally, the use of EDTA is prohibited in some countries.

Numerous attempts to replace EDTA with natural ingredients have been unable to meet commercial shelf life constraints, are cost prohibitive, or have resulted in undesirable flavors and/or colors in the food or beverage products. For example, naturally produced siderophores (from yeast and fungi) are effective metal chelators but can unacceptably change the color of the food. Additionally, botanical extracts may have as little as 2 percent of the active compound, if the precise active compound is even known. These extracts may further contain additional non-effective compounds that impart an undesirable flavor, color, or texture to the products. An example of such an extract is rosemary extract, which has antioxidant properties, but incorporating rosemary extract into a food or beverage for its antioxidant properties may also impart a distinct rosemary flavor, which is undesirable in many products.

Because of EDTA's efficacy and reasonable cost, as well as difficulties in identifying viable alternatives, EDTA has been challenging to replace. Therefore, it is desired to provide oxidatively stable foods and beverages that do not require the use of EDTA but that retain the extended shelf-life presently afforded by the use of those types of preservatives.

BRIEF DESCRIPTION OF THE DRAWINGS

FIG. 3 is a graph of free radical formation as a function of time in mayonnaise samples that include natural ingredients in comparison with EDTA. FIG. 3 includes a subset of the data points of FIG. 2.

DETAILED DESCRIPTION

Provided herein are food and beverage products in the form of oil-in-water emulsions characterized by significantly improved oxidative stability despite being substantially free of EDTA. The food or beverage products provided herein include a natural stabilizer or combination of natural stabilizers, particularly high molecular weight polymers with chelating functionality. In particular, the high molecular weight polymers with chelating functionality includes alginate and/or low methoxy pectin. As used herein, the natural stabilizers are obtained from plants or other natural sources. Alginate is a polysaccharide typically obtained from the cell wall of brown seaweed (Phaeophyceae) and from some species of bacteria. Pectin is a naturally occurring polysaccharide in plant cell walls, and is commercially extracted from citrus fruit peel and apple pomace. Caseinate, particularly calcium caseinate, is commonly produced from milk.

Oil-in-water emulsions are prone to generation of free radicals. While not wishing to be bound by theory, it is presently believed that the natural stabilizers described herein are effective to reduce free radical generation by positioning the stabilizer at the emulsion interface and providing effective levels of conjugated covalent bonds to stabilize free radicals and provide ample resonance. Advantageously, the natural stabilizers described herein provide oxidative stability similar to that obtained using EDTA and without adversely impacting the flavor, color, texture, or rheological characteristics of the food or beverage products. As a result, the natural stabilizers described herein are effective to extend product shelf-life with minimal or no adverse impact on product quality or consumer acceptance.

Inclusion of the natural stabilizers in the oil-in-water emulsions has been shown to significantly increase the shelf-life of the emulsions without any added EDTA. Generally, a mayonnaise product not containing EDTA is considered to be shelf-stable for a period of only 3 to 4 months at room temperature (i.e., about 70° F. or 21° C.). When EDTA is added to the mayonnaise, the shelf-life at room temperature is generally extended to about 9 to 12 months. Inclusion of the natural stabilizers described herein has been shown to provide a shelf-life of at least 7 months, in another aspect at least 8 months, and in another aspect at least 9 months at room temperature. Shelf-life may also be measured at heat-abused testing conditions, such as at 30° C. and 70% relative humidity. In such conditions, inclusion of the natural stabilizers described herein has also been shown to provide a shelf-life of at least 7 months. At least in some approaches, such shelf-life is achieved in a non-colored, transparent container that lacks any added oxygen scavengers, oxygen blockers, or nitrogen headspace flushing. If the food product is density-adjusted with nitrogen, the amount of nitrogen added is not enough to change the overall product oxygen concentration.

As used herein, a product having acceptable properties during its shelf-life is characterized as having an emulsion that has not separated, has minimal deterioration in product taste, odor, and color, and is not substantially different in texture or apparent viscosity. The oil-in-water emulsions produced herein can be evaluated for physical stability using known methods, such as, for example, the procedure described by Titus et al., "Emulsifier Efficiency in Model Systems of Milk Fat or Soybean Oil and Water," Food Technology, 22:1449 (1968); and by Acton et al., "Stability of Oil-in-Water Emulsions. 1. Effects of Surface Tension, Level of Oil, Viscosity and Type of Meat Protein," J. Food Sci., 35:852 (1970). Additional information concerning the formation and testing of oil-in-water emulsions is present in Becher, Encyclopedia of Emulsion Technology (Volume 1, Basic Theory, Marcel Dekker, Inc., New York (1983)), and Sherman, Emulsion Science (Academic Press, New York (1968)). Methods for primary and secondary oxidation tests (e.g., peroxide value and gas chromatography measurements) are also provided by the American Oil Chemists Society, and may be found in their book of methods: https://www.aocs.org/store/shop-aocs/shop-aocs?productId=70978091. Each of these references is incorporated herein in their entireties.

The oil-in-water emulsions described herein generally comprise an emulsifier, a discontinuous oil phase, and a continuous aqueous phase. The food products may include, for example, salad dressing, mayonnaise, sandwich spread, dip, creamy sauce, dipping sauce, ice cream, eggless mayonnaise-type product, tartar sauce, oleomargarine, and egg- and cream-based desserts, such as custard and pudding. Further, it is intended that the terms food and beverage products may also include other consumable products, such as pharmaceuticals, nutraceuticals, and the like. It is also believed that the natural stabilizers described herein may be used in other types of emulsified products, including non-food products, such as cosmetics, soap, and shampoos, where EDTA is commonly used.

The food and beverage products described herein utilize high molecular weight polymers with chelating functionality as a replacement for EDTA. It was surprisingly found that these high molecular weight polymers were effective to provide desired shelf stability to the oil-in-water emulsions despite not having the same chelating affinity for iron ($Fe^{3+}$). Without wishing to be limited by theory, it is further hypothesized that their large molecular size may slow the reactivity of iron by creating steric hindrance at the oil/water emulsion interface. Again, without wishing to be limited by theory, it is further hypothesized that some high molecular weight polymers, like alginate, that gel in the presence of calcium may create a physical barrier on the micro-scale to iron's reactivity at the interface by reacting with discrete calcium ions introduced by local water supply during manufacture of the emulsion.

Commercially available pectin products generally have a molecular weight of about 60,000 to 130,000 g/mol. Pectin is categorized into two classes based on degree of esterification (DE): high methoxy pectin and low methoxy pectin. A type of pectin found to be particularly useful herein is low-methoxy pectin, and more particularly those having a degree of esterification (DE) up to 25%, and even more particularly having a DE ranging from 12 to 18%. Low methoxy pectin is believed to be particularly useful herein because (1) lower DE pectins have a lower impact on viscosity, and (2) lower DE pectins have more reaction sites for iron chelation. Pectin is generally soluble in pure water. Low methoxy pectin is highly prone to gelation in the presence of calcium ions (or other divalent cations), even at levels commonly found in tap water (such as in the form of calcium carbonate). The presence of small amounts of sugar in the product can also reduce the amount of calcium required to trigger gel formation. Pectin may be included in any effective amount, such as about 0.05 to about 1 percent, in another aspect about 0.1 to about 0.75 percent, in another aspect about 0.1 to about 0.6 percent, and in another aspect about 0.25 to about 0.35 percent. Generally while higher amounts of pectin may be effective from a stability perspective, the higher amounts may provide undesirable thickness to the product.

Alginate may be obtained in a variety of molecular weights. For example, commercially available sodium alginate typically has a molecular weight ranging from 35 to 50 kDa. The viscosity of alginate solutions depends on its usage rate, as well as the chain length, with longer chains (more monomer units) producing more viscous solutions at a given concentration. Product and processing parameters will also affect alginate viscosity. For instance, gelation is induced by calcium concentration and pH 3.38-3.65 (pKa's of mannuronic acid and guluronic acid, respectively), whereas highly acidic environments will cause alginate breakdown, thereby shortening chain length and reducing viscosity.

Like pectin, alginate may be used to form a gel by mixing alginate with an ionic cross-linking agent, such as a divalent cation. Therefore, to avoid alginate affecting the viscosity or other textural attributes of the food or beverage products described herein, it is generally desirable to consider and control the possible sources of divalent cations from other ingredients of the products. In one particular aspect, the alginate employed in the current invention is a non-hydrolyzed alginate. In another particular aspect, the alginate is a low viscosity alginate.

The amount of alginate used should be effective to provide oxidative stability and to provide the desired texture to the product. For example, the amount of alginate may be between about 0.05 to about 1.0 percent by weight of the product, in another aspect about 0.1 to about 0.5 percent, and in another aspect about 0.15 to about 0.35 percent.

Caseinate, particularly calcium or sodium caseinate, is commonly included in food products as an emulsifier or thickener. The caseinate may be included at any effective amount, such as from about 0.1 to about 3 percent, in another aspect about 0.1 to about 0.5 percent by weight of the product. The caseinate can introduce a gritty texture to the product, so, if included, the amount may be selected to avoid imparting an undesirable mouthfeel to the product.

While low-methoxy pectin, caseinates, and alginates have been used in the food industry to increase the thickness of various food products, they are not believed to have been included in high-fat products, such as those described herein, which would already have a thick consistency due to the high oil content.

In the food or beverage products provided herein, these high molecular weight polymers are included in a sufficient amount to chelate metal ions, thereby improving oxidative stability of the oil in the oil-in-water emulsions, but in such low amounts so as to have minimal impact on the thickness or texture of the final product. The food or beverage products described herein are in the form of an emulsion and not in the form of a gel at ambient or refrigeration temperatures. In some approaches, the food or beverage products provided herein may be characterized by oil droplets having a mean droplet size of about 2 to about 40 µm, in another aspect about 2 to about 10 µm.

In one aspect, the amount of the high molecular weight chelating polymer in the products, whether a mayonnaise or dressing product, is included in a "non-thickening amount" and imparts minimal thickening effect to avoid adversely impacting the texture of the product. In one aspect, the non-thickening amount of the high molecular weight polymer imparts less than about 35 percent change in complex viscosity, in another aspect less than about 25 percent change in complex viscosity, in another aspect less than about 15 percent change in complex viscosity, in another aspect less than about 10 percent change in complex viscosity, and in yet another aspect less than about 5 percent change in complex viscosity in comparison to an otherwise identical product in which the amount of high molecular weight chelating polymer has been replaced with water (with the amounts of all other ingredients being equal). As explained in more detail below, because some products may be shear thinning, the complex viscosity may be lower than the zero shear viscosity.

As used herein, complex viscosity is the viscosity estimated from a dynamic rheological experiment. It is the flow property of the material as a response to applied sinusoidal to stress/strain. In some approaches, addition of a high molecular weight chelating polymer may cause shear thinning. Firmness of the product is proportional to the molar concentrations of intermolecular bonds. It is represented by the shear modulus G that is given by G=nRT where "n" represents the molar concentration of the bonds. The firmness is calculated by G', G' values by taking into account the viscoelastic behavior of the material. Since for all these materials G'>>G", G (shear modulus or firmness) will be approximately the same as G'. Relaxation time is the measure of how fast material relaxes to an equilibrium state after releasing the applied stress/strain. For example, viscous liquid relaxes faster by dissipating the energy through flow and will have 0 relaxation time. Elastic solids take longer time to reach an equilibrium state by stretching themselves back. Hence, materials with lower relaxation time will stick to a surface on application of a uniform strain. Relaxation time is inversely proportional to tan delta. At any temperature, more stability or resistance to change in viscoelastic properties can be expected for the materials with higher relaxation time or low tan delta values. Tan delta is the ratio of energy dissipated to the energy stores in a viscoelastic material, when the material is subjected to stress or strain. Apparent zero shear viscosity is the product of firmness (shear modulus) and relaxation time. It is the material property related to internal structure of the material and independent of applied strain rate. Complex viscosity is the viscosity estimated from a dynamic rheological experiment. It is the flow property of the material as a response to applied sinusoidal to stress or strain. For this study, this was measured at a frequency of 10 rad/s. Some materials may be shear thinning; therefore, complex viscosity at 10 rad/s may be lower than the zero shear viscosity.

For example, the complex viscosity of an oil-in-water emulsion product can be measured using a DHR rheometer with parallel plate attachments (25 mm cross hatched parallel top plate with 60 mm cross hatched bottom plate and 1 mm gap between plates) over a ramping temperature range of 5-60° C. Specifically, temperature increased at 2° C./min, the applied stress was 10 Pa, and the frequency was 10 rad/s. The processing conditions greatly impact the resulting product viscosity as smaller emulsion droplets will produce significantly more viscous product, which is, accordingly, more stable to creaming forces. Again, the non-thickening amount is also effective to not provide the product in the form of a gel.

In one particular aspect, the food product is in the form of an oil-in-water emulsion and includes about 40% to about 80% oil, about 0.5% to about 5.5% emulsifier, about 11% to about 52% water, an acidulant in an amount effective to provide an acidic pH of about 3.1 to about 4.1, and a high molecular weight chelating polymer in a non-thickening amount that is effective to provide oxidative stability to the food or beverage product for at least about 5 months at 23° C. when the emulsion is substantially free of EDTA.

In another aspect, the food product is a traditional, full-fat mayonnaise product and includes about 65% to about 80% oil, about 3% to about 8% egg-based emulsifier, about 6% to about 26% water, an acidulant in an amount effective to provide an acidic pH of about 3.3 to about 4.1, and a high molecular weight chelating polymer in a non-thickening amount that is effective to provide oxidative stability to the food or beverage product for at least about 5 months at 23° C. when the emulsion is substantially free of EDTA. In egg-free mayonnaise-type products, the amount of egg-based emulsifier may be replaced with another emulsifier, and the ranges of other ingredients may also vary. In reduced-fat and light mayonnaise-type products, the range of ingredients may vary from those specified here.

In another aspect, the food product is a dressing and includes about 10% to about 50% oil, about 0.2% to about 3.5% emulsifier, about 40% to about 80% water, an acidulant in an amount effective to provide an acidic pH of about 3.1 to about 3.8, and a high molecular weight chelating polymer in a non-thickening amount that is effective to provide oxidative stability to the food or beverage product for at least about 5 months at 23° C. when the emulsion is substantially free of EDTA. The dressing may be a spoonable or pourable product and may be a one phase (e.g., a creamy or cheese-based dressing) or two phase (e.g., a vinaigrette dressing) product. If desired, a hydrocolloid such as xanthan gum may be included at levels that do not negatively impact the efficacy or minimal viscosity contributions of the high molecular weight chelating polymer.

The oil useful in any of the embodiments herein can be any food grade oil, and preferably is liquid at refrigeration temperatures. Suitable oils include, for example, canola, soybean, safflower, sunflower, sesame, grapeseed, almond, cottonseed, peanut, olive, cashew, corn, algal, and combinations thereof. In some approaches, a high oleic version of these oils may be preferred, as high oleic oils generally have higher oxidative stability and may significantly improve the performance of the high molecular weight chelating polymer. Other types of oil, such as essential oil, may also be included.

The emulsifier useful in any of the embodiments herein may include, for example, egg-based emulsifier, lecithin, or a combination thereof. The egg-based emulsifier may be a liquid, dried, or frozen egg yolk product, such as whole egg, egg yolk, enzyme-treated egg yolk, or a combination thereof. The egg-based emulsifier may be salted, if desired. Synthetic emulsifiers including, but not limited to, polysorbates and propylene glycol esters may also be used where regulations and consumer demand permit. The acidulant may be, for example, food grade acid (e.g., malic, citric, phosphoric, lactic, acetic, tartaric, fumaric, adipic, ascorbic, succinic, or a combination thereof), vinegar, lemon juice, lime juice, or a combination thereof.

Additional ingredients useful in any of the embodiments herein, such as sweetener (e.g., sucrose), salt, spice, herb, flavoring (e.g., mustard seed extract and/or oleoresins and/or ribotides), crystallization inhibitor (e.g., oxystearin, lecithin, or polyglycerol esters of fatty acids), dairy ingredients (e.g., whey), color (natural or synthetic), and antimicrobial ingredients (e.g., sorbate and/or cultured dextrose) may also be included, if desired. Starch (e.g., wheat, maize, waxy maize, rice or other food starches) and additional hydrocolloid (e.g., xanthan gum) may also be added, if desired. Particulates (e.g., whole vegetables, herbs, and/or cheese) may also be added, if desired.

Advantageously, the food products herein are substantially free of EDTA, such as in the form of calcium disodium ethylenediamine-tetraacetate or disodium ethylenediaminetetraacetate. As used herein, "substantially free of EDTA" is intended to mean a product having less than about 1 ppm EDTA. In yet another aspect, the term "substantially free of EDTA" means that the product includes no EDTA.

The natural stabilizers described herein may be used in combination with one or more antioxidants, which may further slow the rate at which oxidation occurs. Preferably natural antioxidants are used, such as alpha-tocopherol, carotenoids (such as beta-carotene), flavonoids, catechins, and phenolic compounds. Added antioxidants may be in the form of isolates or plant extracts. Commercially available antioxidants, such as GUARDIAN® CHELOX (commercially available blend of chamomile and rosemary extract from DuPont), may also be used, if desired. At least in some formulations, it was surprisingly found that water-soluble antioxidants were particularly effective, though the so-called "polar paradox" theory would predict that lipid-soluble antioxidants should be more effective. The antioxidants included in the food or beverage products may be provided as isolated compounds (i.e., of relatively high purity) or as a minor component of another ingredient, such as beta-carotene in paprika extract or carrot juice concentrate, or alpha-tocopherol in a Vitamin E supplement. Other extracts may also be used, such as rosemary extract, green tea extract, grapeseed extract, cherry extract, and combinations thereof. It was found that including one or more antioxidants without the natural stabilizers herein were ineffective to stabilize the oil-in-water emulsions long enough to provide a sufficient product shelf-life.

At least in some embodiments, certain combinations of high molecular weight polymers with chelating functionality and antioxidants were found to be particularly effective in increasing product shelf life. Those combinations include: (1) low methoxy pectin (DE 18) in oil; (2) high oleic oil and low viscosity alginate; (3) low viscosity alginate, alpha-tocopherol, and beta-carotene; and (4) low methoxy pectin (e.g., DE 12) and GUARDIAN® CHELOX L.

Method

The high molecular weight polymer may be added to foods or beverages using a number of methods. For example, the high molecular weight polymer may be added with other ingredients during the formation of the food or beverage or, by other approaches, may be added after all other ingredients have been added. If the food product is a mayonnaise, the high molecular weight polymer may be incorporated into conventional mayonnaise processes. The high molecular weight polymer can be added to either the oil or aqueous phase. In some approaches, it has been found that it is advantageous to premix the high molecular weight polymer with other dry ingredients to prevent the formation of so called "fish-eyes" in the final product.

When making a mayonnaise-type product, generally oil is added slowly to an aqueous mixture of egg-based emulsifier, salt, sugar, and spices. Vinegar is generally added slowly either before or after the oil addition. At least in some approaches, it has been found that mixing the high molecular weight polymer with oil prior to adding to the other ingredients may be beneficial.

Advantageously, the food and beverage products described herein can be prepared using conventional mixing equipment and techniques. The pressure employed, the shear rate, and/or the time for mixing may vary widely dependent upon the particular equipment employed. For example, a pin or other rotor stator mixer can be used. The methods for making the products described herein can be readily carried out by commercial manufacturers at little additional cost.

Packaging

In some approaches, the packaged food or beverage products described herein may benefit from reduction of oxygen to further slow lipid oxidation, such as through packaging techniques or container design. For example, oxygen may be removed from packaged products by flushing the headspace with an inert gas, such as nitrogen, or by sparging the product with nitrogen to reduce the dissolved oxygen. In at least one aspect, the oxygen content of the packaged product may be decreased from about 12.5% (before sparging) to under about 2% (after about one hour of sparging). However, it has been found that sparging mayonnaise products with nitrogen can result in negatively impacting the density of the product and causing product "pitting," which may be visually unappealing. Sparging also adds expense and time to the production process.

The food or beverage products described herein may be provided in a variety of types of packages, such as glass or plastic containers. The type of packaging selected can impact the rate of oxidation of the product (particularly of the oil in the product) by controlling the amount of oxygen in the package and limiting exposure to UV light. Glass bottles generally provide better protection than plastic bottles, and colored glass (e.g., amber or green glass) generally provides better protection than clear glass. However, glass bottles can be less desirable than plastic due to their fragility and heavier weight. Plastic containers are generally desirable due to their durability and low weight but permeability to oxygen and UV light transmission can result in decreased product shelf life.

With respect to plastic, food containers are commonly made from high density polyethylene (HDPE) or polyethylene terephthalate (PET). Oxygen barriers (e.g., Ethylene-Vinyl Alcohol, Aluminum Oxide) or scavengers (e.g., Solo2.1, Amosorb) can be added to the containers to reduce oxygen transmission to the product. However, it was surprisingly found that light, rather than oxygen, was the most significant prooxidant for oil-in-water emulsions, particularly mayonnaise products. It was found that PET containers having oxygen barriers or scavengers provided no statistical improvement to the shelf-life of the oil-in-water emulsions described herein which lacked artificial preservatives like EDTA. Instead, it was found that a UV-light barrier could be added to the packaging material in the absence of oxygen barriers or scavengers to increase the shelf-life of the oil-in-water emulsions. For example, a UV barrier such as Ultimate390, commercially available ColorMatrix™ light blocking additive from PolyOne at a 0.12% letdown in PET containers (and without inclusion of oxygen barriers or scavengers) was effective to further extend the shelf-life of oil-in-water emulsions which contained one or more natural stabilizers in accordance with the present disclosure.

It is also particularly preferred that the UV barrier not contribute color or opacity to the container so that consumers can readily see the product in the container.

Advantages and embodiments of this invention are further illustrated by the following examples, but the particular ingredients and amounts thereof recited in these examples, as well as other conditions, and details, should not be construed to unduly limit the invention. All parts and percentages are by weight unless stated otherwise.

EXAMPLES

Example 1

Samples were prepared by using a model, unflavored ranch base containing no chelating agent or other preservative; the lack of flavor mimicked the neutral taste of mayonnaise, allowing for detection of unwanted flavors and colors from the EDTA alternatives. The ranch base included 38% soybean oil, 45% water, and had a pH of about 3.8. Various natural chelators and antioxidants were added and mixed into the mayonnaise base according to Table 1 below:

TABLE 1

| Sample | Additive | Wt. % |
|---|---|---|
| A | Alginate (Protanal GP 1740 from FMC) | 0.89 |
| B | Sodium Caseinate (Fonterra) | 2.70 |
| C | GUARDIAN ® Rosemary extract 221 (Danisco) | 0.05 |
| D | GUARDIAN ® Chelox L (Danisco) | 0.08 |
| E | GUARDIAN ® 81 Acerola cherry & green tea (Danisco) | 0.10 |
| F | Grindox 497 ascorbyl palmitate & tocopherols (Danisco) | 0.10 |
| G | Grapeseed extract (Lalilab) | 0.10 |
| H | GENU ® Pectin - LM-12 (CPKelco) | 0.375 |
| I | GENU ® Pectin - LM-18 (CPKelco) | 0.375 |
| J | Negative control | NA |
| K | Calcium Disodium EDTA (Brenntag) | 0.0075 |

Lipid Oxidation Testing

The samples in Table 1 were tested for stability against lipid oxidation using a quantitative electron paramagnetic resonance ("EPR") method to measure the quantity of free radicals (expressed as 4-hydroxy-2,2,6,6-tetramethylpiperidinyloxy (TEMPOL) equivalent) at the micromolar (microM) level at various time points over a three-day period at 37° C. EPR provides an indication of relative stability and shelf-life by measuring the quantity of free radicals formed over the incubation period, with lower levels of free radicals being indicative of greater stability. To conduct the EPR analysis, a Bruker e-scan R instrument (Bruker Corporation, Billerica, Mass.) was employed and samples were prepared and analyzed as follows:

a) 5-10 glass beads and 50 µL PBN solution (200 mM of α-phenyl-N-tert-butylnitrone (PBN, Alexis Biochemicals) diluted in Neobee oil) were placed in an empty 20 mL scintillation vial.

b) 5.00 g of fresh and well mixed sample was placed in the vial. The vial was closed and mixed thoroughly with the help of a vortex mixer. The vial was incubated at 37° C.

c) Samples were withdrawn at 20, 44, and 68 hours using an aspirator into 50 µL pipets and the bottoms of the pipets were sealed with Critoseal wax. The vials were returned to the incubator after sampling.

d) For analysis, each pipet was inserted into a 3 mm EPR tube and the tube was inserted into the EPR instrument cavity.

e) The EPR instrument, programmed with WIN EPR Acquisition software, generated a spectrum file, which was converted to TEMPOL (free radical) equivalents.

Figure 1:
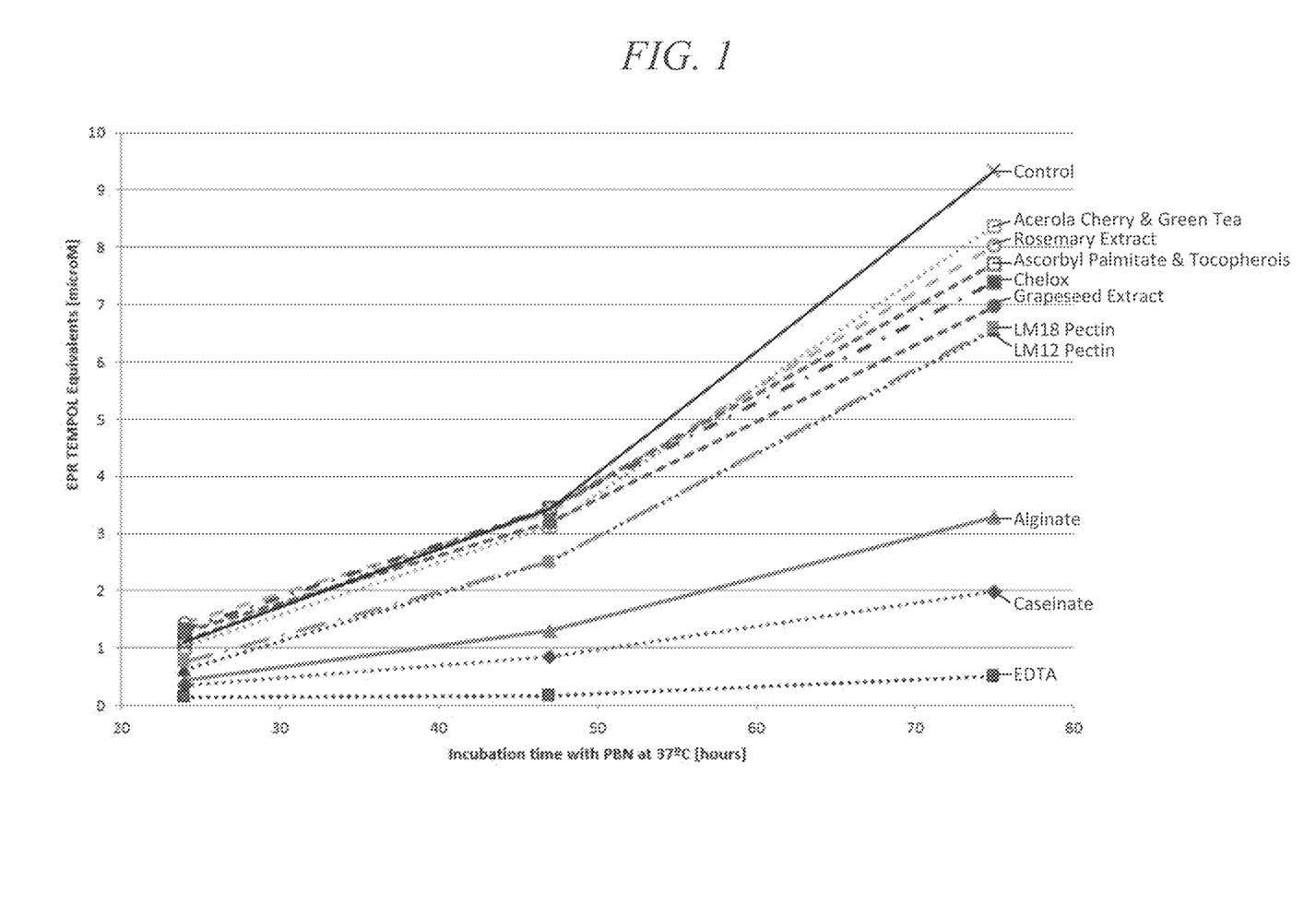
FIG. 1 is a graph of free radical formation as a function of time in a model ranch dressing model system containing 40% oil that include natural ingredients in comparison with EDTA.

The EPR results for the samples in Table 1 are shown in FIG. 1. Other than EDTA, the best performing samples were caseinate, alginate, and the two pectin samples, which had nearly identical results. All of these ingredients function as chelators, meaning their negatively charged moieties can interact with positively charged iron and similar metal-based catalysts of lipid oxidation. In contrast, the plant extracts function as antioxidants through stabilization—via delocalization and resonance—of generated free radicals. In other words: chelators prevent the induction of lipid oxidation whereas antioxidants slow the rate of propagation. While the four chelating ingredients best protected EDTA-free product from oxidation, it should be noted that the caseinate imparted gritty texture at the 2.70% usage level and introduced milk protein, which may or may not be an allergen concern in certain product applications. Alginate, LM-12 pectin, and LM-18 pectin all contain different concentrations of negatively charged moieties. This concentration of charges and their spatial distribution along the large molecular weight compound likely effected the ingredient's overall chelation efficacy. However, based on this logic, it was surprising that the LM-12 and LM-18 pectins performed similarly since they theoretically differ only in the concentration of methoxy groups. It is likely that the special constraints of each large molecular weight compound affected its unique ability to dissolve and unfold in the matrix. Compounds best able to partition at the oil/water interface should be most effective at minimizing lipid oxidation. Therefore, the higher efficacy of alginate compared to pectin is likely due to a combination of its charge density, the distribution of those charges along the molecular backbone, and the ability of the alginate to dissolve/unfold in the emulsion and partition at the oil/water interface, the critical site of all lipid oxidation reactions. The stabilizing effect of caseinate>alginate>pectins, which also corresponds to the usage (i.e. larger concentration of negative charges). Again, usage was limited by the ingredients' impact on viscosity. It is unlikely that an increase in viscosity itself impacted oxidation stability since (1) preservative-free mayo, a highly viscous product oxidizes as rapidly as preservative-free Ranch dressing, and (2) the mobility of iron, a small molecule, is rate-limited only by diffusion kinetics, meaning that iron, like water, is highly mobile throughout the system even as viscosity increases.

Example 2

Samples were prepared by forming two mayonnaise bases. The first mayonnaise base included regular soybean oil. The second mayonnaise base included high oleic soybean oil. In pertinent part, the mayonnaise base included about 80% soybean oil (regular or high oleic), 5.2% egg-based emulsifier, about 0.9% salt, about 11% water, and had a pH of 3.6. The base also included sugar, flavors, and lemon juice for taste. Controls were prepared with and without EDTA, and experimental samples were prepared with high molecular weight chelating polymers with and without antioxidants according to Table 2 below:

TABLE 2

| Samples | Soybean Oil | GENU® Pectin-LM-12 (CPKelco) | Protanal GP 1740 Alginate (FMC) | GUARDIAN® Rosemary extract 221 (Danisco) | HERBALOX® Rosemary blend (Kalsec) | EDTA |
|---|---|---|---|---|---|---|
| 1 (negative control) | Regular | | | | | |
| 2 | Regular | | 0.33% | 0.08% | | |
| 3 | Regular | | 0.33% | | | |
| 4 PIO | Regular | 0.2% | | | 0.1% | |
| 5 | Regular | 0.1% | | | | |
| 5 PIO | Regular | 0.2% | | | | |
| 6 | Regular | | | 0.08% | | |
| 7 | High oleic | | 0.33% | 0.08% | | |
| 8 | High oleic | | 0.33% | | | |
| 9 | High oleic | 0.1% | | | 0.2% | |
| 10 | High oleic | 0.1% | | | | |
| P10 PIO | Regular | 0.1% | | | | |
| 11 | High oleic | | | 0.08% | | |
| 12 (negative control) | High oleic | | | | | |
| 13 (EDTA control) | Regular | | | | | 0.0076% |

Notes:
PIO = pectin put in oil

The mayonnaise bases without additional chelating agent or other preservative were used as the negative controls. The remaining samples were prepared according to Table 2. Sample 13 was an EDTA-containing control (with 0.0075% EDTA).

Samples were prepared by premixing the egg-based emulsifier, water, salt, sugar, and spices. Antioxidants (from Danisco or Kalsec) and EDTA were also added at this stage. Oil was then added slowly, under constant agitation, to this mixture. Finally, vinegar was added slowly, under constant agitation. The resulting product was a coarse emulsion that was further sheared to form a fine emulsion with average droplet diameter of 6-7 μm. For samples containing pectin or alginate, the powders were first dry blended with the dry salt, sugar, and spices and then added to the egg mix under constant agitation. Samples with the abbreviation PIO (put in oil) in the name were prepared similarly except that the pectin was added, under constant agitation, directly to the oil. Specifically, straight pectin was whisked into the oil in one container. In another container, egg-based emulsifier, water, salt, sugar, and spices were blended. Then the oil-pectin mixture was added, slowly and under agitation, to the egg mix. Finally, vinegar was slowly added, followed by a more intense shear step.

Lipid Oxidation Testing

Figure 2:
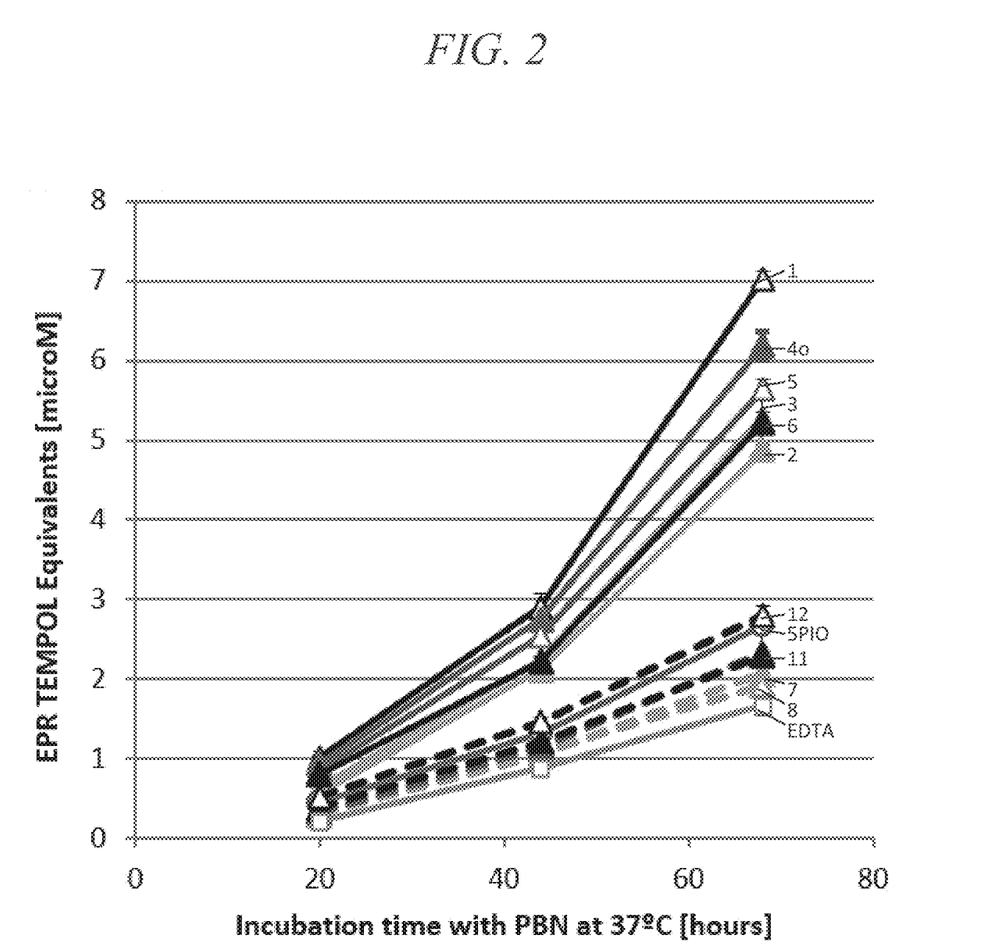
FIG. 2 is a graph of free radical formation as a function of time in mayonnaise samples that include natural ingredients in comparison with EDTA.
Figure 3:
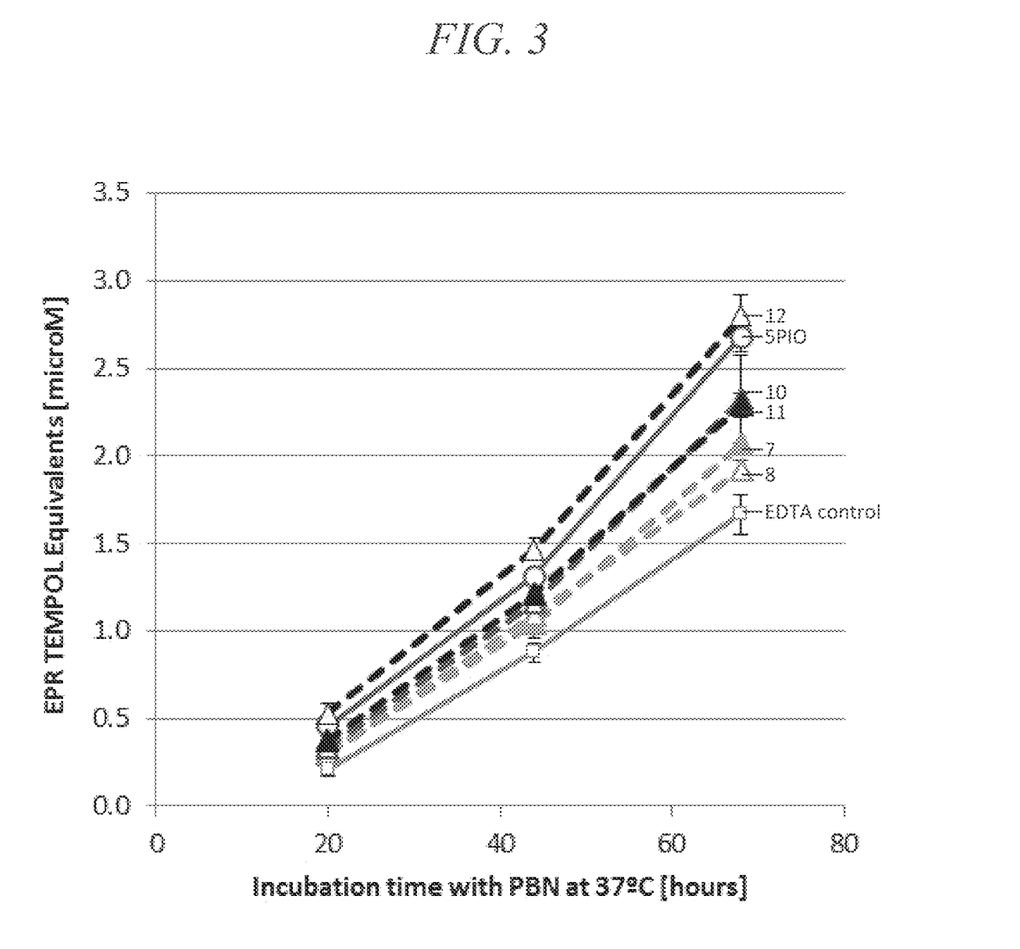

The samples in Table 2 were tested for stability against lipid oxidation using a quantitative electron paramagnetic resonance ("EPR") method as described in Example 1. The EPR results for the samples in Table 2 are shown in FIGS. 2 and 3. Higher levels of TEMPOL equivalent present in a sample indicate a lower ability to resist or prevent the formation of free radicals, Lower levels of TEMPOL equivalent indicate that the sample has a protective effect and aids in the prevention of the formation of free radicals. By reducing free radical formation and thereby lowering the amount of free radicals present in the product, oxidation of the product is reduced as well.

The top performing samples are shown separately in FIG. 3. Relative to the EDTA control (13), the top performing samples include the two samples with alginate (7 and 8), the high oleic oil control (12), the rosemary extract (11), and the two samples with pectin (5PIO and 10). EPR is a predictive test. Samples 11 and 12 performed well in the EPR predictive analysis but were not overall preferred by trained panelists at the end of shelf life sensory testing. EPR is a predictive tool that exacerbates lipid oxidation and cannot account for all other product changes based on ingredient interactions. Also, these samples contained high oleic oil, which does generate different oxidative compounds in different quantities than traditional soybean oil. It is likely that samples 11 and 12 were less preferred by panelists because the unique oxidative compounds were less pleasing than the other samples. It may be that the pectin and alginate in the other high oleic samples interacted with these unique oxidative compounds in unknown ways to minimize their deleterious sensorial impact.

Shelf-Life Testing

The samples in Table 2 were also subjected to shelf-life testing under two sets of conditions: (1) in an accelerated shelf-life test ("Hotbox"), the samples were incubated for 5 months at 28-35° C.) and 70% relative humidity; and (2) in an ambient shelf-life test ("Ambient"), the samples were incubated for 8 months at 23° C. and ambient relative humidity.

The samples were subjected to taste tests at various time points. The samples were tested by a Qualitative Descriptive Analysis panel compromised of highly trained consumers to determine if and when the mayonnaise products failed from a sensory perspective, including aroma, flavor, or texture, over the course of the shelf life study. The samples were tested once a month to assess the level of oxidation in the samples, and the samples were evaluated for "stale canola oil" aroma, "rancid" aroma, "stale canola oil" flavor, "herb/grassy" flavor, "vinegar" flavor, "artificial" flavor, "thickness" mouthfeel, and "creaminess" mouthfeel. All of the treatments developed similar off-flavors (e.g., hexanal, heptadiental)—albeit at different rates—throughout shelf life as control mayonnaise, indicating that the inclusion of high molecular weight chelators, high oleic oil, and antioxidants did not shift the mechanistic pathway of lipid oxidation towards less-traditional paths. In other words, EDTA-free mayo follows traditional lipid oxidation pathways involving the formation, and eventual beta-scission, of lipid hydroperoxides. Trained panelists did not detect significantly more herbal or grassy flavors from the treatments containing antioxidants. The lack of flagged grassy/herbal notes further indicates that hexanal, a common aldehyde marker for soybean oil oxidation that is noted grassy odor, was prevented from developing in detrimental quantities. Finally, all treatments were considered equally "creamy" in mouthfeel, a key positive attribute and driver for mayonnaise liking. Thus, unlike many of the other attempted solutions in the art, the inventive products containing high molecular weight chelating polymer did not greatly impact mayo sensory attributes.

Example 3

Additional samples were prepared by forming a mayonnaise base containing no chelating agent or other preservative. The mayonnaise base was prepared according to Example 1. The mayonnaise base without additional chelating agent or other preservative was used as the negative control (sample 301). The remaining samples were prepared according to Table 3 (amounts in weight %). Notably, both oil and water-soluble antioxidants were evaluated, particularly for green tea extract, which was obtained in water and oil-soluble forms to compare efficacy differences. Sample 307 was an EDTA-containing control (with 0.0075% EDTA).

Samples 301-306 were placed in both UV-blocking containers made from PET with 0.12% letdown Ultimate390, commercially available ColorMatrix™ light blocking additive from PolyOne, and traditional single-layer PET containers. Sample 306 was only placed in traditional single-layer PET containers. Samples 301-307 were stored in both a MacBeth Spectra Light III lightbox (setting "cool white fluorescent light+UV"; temperature 30° C. due to heat generated by bulbs) for 6 weeks and in a dark incubator at 30° C. for 6 months. The remaining samples (308-314) were placed in single-layer PET containers and stored in a dark incubator at 30° C. for 6 months.

TABLE 4

| Sample | UV Packaging | Initial Observations |
| --- | --- | --- |
| 301 | X | Normal |
| 302 | X | Sample did not complete shelf life testing. |
| 303 | X | Highest catechin content of any green tea. Significant browning. |
| 304 | X | Sample did not complete shelf life testing. |
| 305 | X | Normal |
| 306 | X | Normal |
| 307 | X | Normal |
| 308 |   | Normal |
| 309 |   | Browning with age. Non-characteristic mayo flavor. |
| 310 |   | Normal |
| 311 |   | Very nice, thick texture, with slight off flavor. |
| 312 |   | Thinner. Non-characteristic mayo flavor. |
| 313 |   | Some browning. Overly firm. Non-characteristic mayo flavor. |
| 314 |   | Thick, jam-like texture with cleavage. Pronounced saltiness. Non-characteristic mayo flavor. |

Sample 310 performed the best throughout the entire shelf life while the green tea extract was found to promote mayo

TABLE 3

| Ingredient | 301 | 302 | 303 | 304 | 305 | 306 | 307 | 308 | 309 | 310 | 311 | 312 | 313 | 314 |
| --- | --- | --- | --- | --- | --- | --- | --- | --- | --- | --- | --- | --- | --- | --- |
| Guardian green tea extract 20 S (Danisco) | * | 0.012 | 0.02 | 0.25 | * | * | 0.1117 | * | * | * | * | * | 0.1117 | * |
| Novatol alpha tocopherol (ADM) | * | 0.023 | * | * | * | * | * | * | * | 0.0003 | * | * | * | * |
| Paprika beta carotene (Kalsec) | * | * | * | * | * | * | * | * | * | 0.0002 | * | * | * | * |
| Genu LM-12 pectin (CP Kelco) | * | * | 0.3 | 0.3 | 0.3 | * | * | * | * | * | * | * | * | * |
| Protanal GP 1740 Alginate (FMC Biopolymer) | * | 0.33 | * | * | * | 0.33 | * | * | * | 0.33 | 0.33 | 0.33 | * | * |
| Chelox (Danisco) | * | * | * | * | * | * | * | * | * | * | 0.08 | * | * | * |
| Clove bud oil (Kemin) | * | * | * | * | * | * | * | * | * | * | 0.003 | 0.003 | 0.003 | 0.003 |
| Toco Blend (Vitablend) | * | * | * | * | 0.1 | * | * | * | * | * | * | * | * | * |
| Phy-O-Blend (Vitablend) | * | * | * | * | 0.05 | * | * | * | * | * | * | * | * | * |
| Distilled water | * | * | * | * | * | 11.36 | * | * | * | * | * | * | * | * |
| Egg white powder | * | * | * | * | * | * | * | * | * | * | * | * | 1.136 | * |
| Bafos Mayo Mix (egg yolk powder, maize starch, antioxidant: rosemary extract (Bavaria Corp. Int'l) OX | * | * | * | * | * | * | * | * | 0.15 | * | * | * | * | * |
| Water-soluble green tea extract (Kemin's RGT-WS) ( | * | * | * | * | * | * | * | * | * | * | * | 0.15 | * | * |
| Sodium gluconate | * | * | * | * | * | * | * | 0.18 | 0.18 | * | * | * | * | * |
| EDTA | * | * | * | * | * | * | 0.0076 | * | * | * | * | * | * | * | browning. The clove oil was found to contribute non-characteristic mayo flavor, although its contributions were muted in Sample 311.

Figure 4:
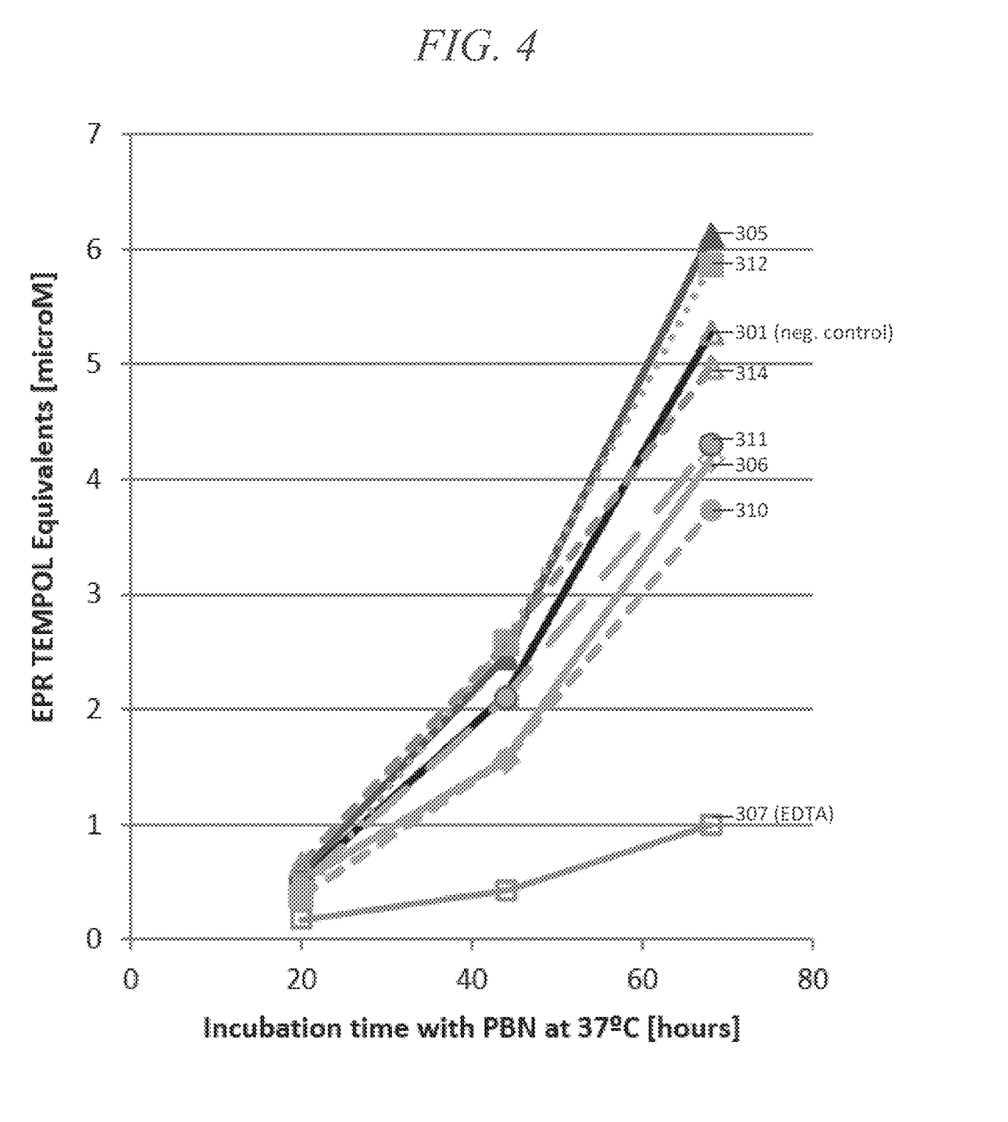
FIG. 4 is a graph of free radical formation as a function of time in mayonnaise samples which contain natural ingredients to replace EDTA.

Like in Example 2, the samples were evaluated using quantitative electron paramagnetic resonance (EPR). The EPR results are shown in FIG. 4. Of those samples, Sample 310 (containing alginate, alpha-tocopherol, and beta-carotene) demonstrated the highest stability against free radical generation after the EDTA control (sample 307). Even though Sample 310 was not as stable as the EDTA control in EPR testing, it was sufficiently stable to withstand 6 months of shelf life at an abusive 30° C., which is satisfactory for most commercial products. It should be noted that EPR testing cannot account for differences in packaging or storage conditions because testing is done on fresh samples that are heat-abused in a dark incubator.

Example 4

A study was conducted to identify the causes of oxidation that were most problematic in oil-in-water emulsion products that lacked EDTA. First, the impact of light was assessed for (1) a ranch dressing product containing herbs (a source of light-sensitive chlorophyll) and buttermilk (a source of light-sensitive riboflavin) and (2) a ranch dressing with no herbs or buttermilk. The ranch dressing included 40% soybean oil. The two products oxidized equally quickly, indicating that it was the oil itself (and the hydroperoxides that form during early oxidation reactions), not photosynthesizers, that are susceptible to light degradation.

A full factorial study was conducted looking at PET packaging with Amosorb Solo2.1 oxygen barrier/scavenger (from ColorMatrix/PolyOne) addition at 0, medium (2%), and high (4%) levels plus or minus Ultimate 390 UV barrier (from ColorMatrix/PolyOne) at 0, medium (0.125%), and high (0.25%) levels. The products were stored in a MacBeth Spectra Light III lightbox (setting "cool white fluorescent light+UV"; temperature 30° C. due to heat generated by bulbs), which provided constant UV and visible light. It was found that the oxygen barrier/scavenger added minimal efficacy but high cost. The trial suggested that packaging should contain 0% oxygen barrier/scavenger but UV barrier at 0.12% letdown to best protect EDTA-free ranch dressing from oxidation while also maintaining similar visual properties of the bottle.

Example 5

Conventional mayonnaise products were prepared but without EDTA. Low viscosity alginate and low viscosity pectin were added and rheological analysis was conducted to assess the impact of removal of EDTA and addition of alginate and pectin on mayonnaise texture. Samples were prepared according to Table 5.

TABLE 5

| Samples | Variable |
| --- | --- |
| 1 | 0.2% low-methoxy pectin added to oil phase |
| 2 | High oleic soybean oil + 0.33% alginate |
| 3 | 0.33% alginate + Novatol + Beta-Carotene |
| 4 | Alpha-tocopherol + Beta-Carotene |
| 5 | 0.33% Low-Methoxy pectin (12) + Chelox |
| 6 | Control |

The rheology test was completed using a DHR rheometer, with 25 mm cross hatched parallel plate with 60 mm cross hatched bottom plate with a geometry gap of 1 mm. In this test, rheological properties were measured as a function of temperature: Loading temperature: 25° C.; Temperature Range: 5-60° C. (heating RTA); Heating Rate: 2° C./min; Stress: 10 Pa; and Frequency: 10 rad/s. All the tests were repeated until two overlaying curves were obtained. The results are presented in Table 6:

TABLE 6

| Samples | Firmness (Pa) | | | Relaxation Time (s) | | | Apparent Zero Shear Viscosity (Pa.s) | | | Complex Viscosity at 10 rad/s | | |
| --- | --- | --- | --- | --- | --- | --- | --- | --- | --- | --- | --- | --- |
| | 5° C. | 25° C. | 37° C. | 5° C. | 25° C. | 37° C. | 5° C. | 25° C. | 37° C. | 5° C. | 25° C. | 37° C. |
| 1 | 747 | 686 | 653 | 0.786 | 0.801 | 0.850 | 587 | 549 | 555 | 74 | 68 | 65 |
| 2 | 923 | 841 | 797 | 0.921 | 0.935 | 1.004 | 850 | 786 | 801 | 92 | 84 | 79 |
| 3 | 868 | 804 | 768 | 0.924 | 0.935 | 1.000 | 802 | 752 | 768 | 86 | 80 | 76 |
| 4 | 854 | 791 | 750 | 0.951 | 0.984 | 1.067 | 813 | 778 | 800 | 85 | 79 | 75 |
| 5 | 922 | 842 | 804 | 0.907 | 0.917 | 0.976 | 836 | 772 | 785 | 92 | 84 | 80 |
| 6 | 731 | 665 | 633 | 0.897 | 0.939 | 1.025 | 656 | 625 | 649 | 73 | 66 | 63 |

It will be understood that various changes in the details, materials, and arrangements of the process, formulations, and ingredients thereof, which have been herein described and illustrated to explain the nature of the method and the natural preservatives may be made by those skilled in the art within the principle and scope of the invention as expressed in the appended claims.

What is claimed is:

1. A food product in a form of an oil-in-water emulsion, the food product comprising:
   oil-in-water emulsion;
   an acidulant in an amount effective to provide the food product with a pH of about 3.1 to about 4.1; and
   a chelating agent in a non-thickening amount that is effective to provide oxidative stability to the food product for at least about 7 months at 21° C. when the emulsion is substantially free of ethylenediaminetetraacetic acid, wherein the chelating agent comprises one or more of a non-hydrolyzed alginate, a low methoxy pectin, and a caseinate.

2. The food product according to claim 1, the food product comprising about 40% to about 80% oil by weight of the food product.

3. The food product according to claim 1, the food product comprising about 11% to about 49% water by weight of the food product.

4. The food product according to claim 1, wherein the food product is a mayonnaise or salad dressing product.

5. The food product according to claim 1, wherein the chelating agent comprises low methoxy pectin in an amount of about 0.05% to about 1% by weight of the food product.

6. The food product according to claim 5, wherein the low methoxy pectin has a degree of esterification value of less than 25.

7. The food product according to claim 1, wherein the chelating agent comprises non-hydrolyzed alginate in an amount of about 0.05% to about 1% by weight of the food product and/or caseinate in an amount of about 0.1% to about 3% by weight of the food product.

8. The food product according to claim 1, further comprising a natural antioxidant selected from alpha-tocopherol, beta-carotene, rosemary extract, green tea extract, grapeseed extract, cherry extract, or a combination thereof.

9. The food product according to claim 1, wherein the food product comprises about 10 to about 50% oil by weight of the food product.

10. An oxidatively stable packaged food product comprising:
a container comprising a UV blocking agent; and
a food product in a form of an oil-in-water emulsion, the food product comprising:
oil-in-water emulsion;
an acidulant in an amount effective to provide the food product with a pH of about 3.1 to about 4.1; and
a chelating agent in a non-thickening amount that is effective to provide oxidative stability to the food product for at least about 7 months at 21° C. when the emulsion is substantially free of ethylenediaminetetraacetic acid, and wherein the chelating agent comprises one or more of a non-hydrolyzed alginate, a low methoxy pectin, and a caseinate.

11. The oxidatively stable packaged food product according to claim 10, wherein the container is a single layer polyethylene terephthalate container.

12. The oxidatively stable packaged food product according to claim 10, wherein the UV blocking agent is included without an oxygen barriers or scavenger in the material forming the packaging.

13. The oxidatively stable packaged food product according to claim 10, wherein the container is non-colored and transparent.

14. The oxidatively stable packaged food product according to claim 10, wherein the food product is a mayonnaise or salad dressing product.

15. The oxidatively stable packaged food product according to claim 10, wherein the chelating agent is low methoxy pectin in an amount of about 0.05% to about 1% by weight of the food product.

16. The oxidatively stable packaged food product according to claim 15, wherein the low methoxy pectin has a degree of esterification value of less than 25.

17. The oxidatively stable packaged food product according to claim 10, wherein the chelating agent includes non-hydrolyzed alginate in an amount of about 0.05% to about 1% by weight of the food product and/or caseinate in an amount of about 0.1% to about 3% by weight of the food product.

18. The oxidatively stable packaged food product according to claim 10, wherein the food product comprises about 10 to about 50% oil by weight of the food product.

* * * * *